June 26, 1962     R. A. POWELL     3,041,059
COMBINED GAS CLEANER AND COOLER
Filed Nov. 19, 1959
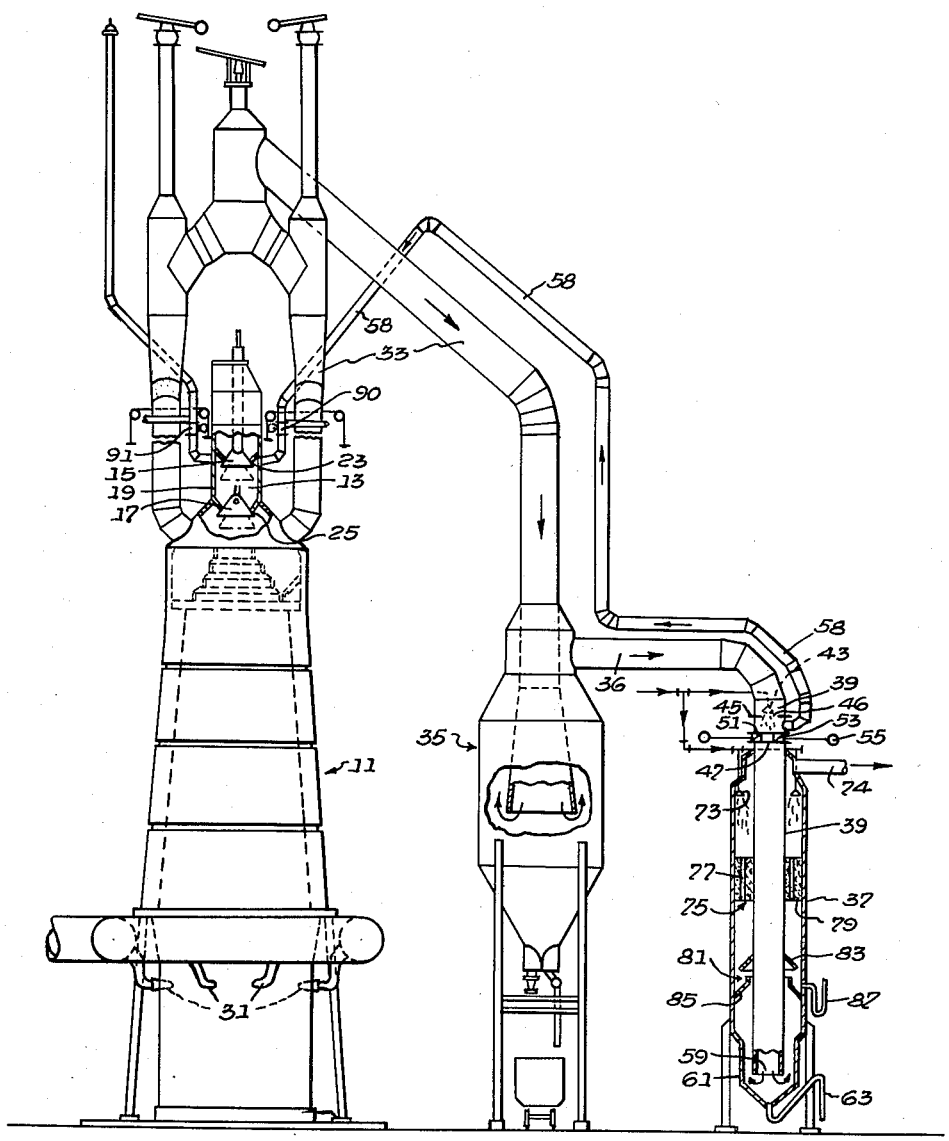
INVENTOR.
RUSSELL A. POWELL.
BY C. Daniel Cornish
his ATTORNEY.

United States Patent Office 3,041,059
Patented June 26, 1962

3,041,059
COMBINED GAS CLEANER AND COOLER
Russell A. Powell, Pittsburgh, Pa., assignor to Koppers Company, Inc., a corporation of Delaware
Filed Nov. 19, 1959, Ser. No. 854,074
3 Claims. (Cl. 266—31)

This invention relates to apparatus for the cleaning and cooling of a gas stream and more particularly to improvements in apparatus for the cleaning and cooling of hot blast furnace gas having entrained particles therein of the common assignee's copending Owen R. Rice application Serial No. 776,072, filed October 8, 1958, now Patent No. 2,964,304, dated December 3, 1960.

In the cleaning and cooling of a gas stream, as is required in various industries, separate cleaning and cooling apparatus frequently accomplish such an operation, the apparatus functioning to recover material from the gas and to make it possible for the gas to be reused or discharged to the atmosphere.

In the operation of a blast furnace, for example, hot air is forced into the furnace and there reacts with coke to produce a reducing gas. The reduced metal and molten slag collect at the bottom of the furnace, and the blast furnace gas passes from the top of the furnace, carrying with it particles of ore, coke and other materials.

Blast furnace operation has been improved, and the entrainment of solid particles in the gas reduced, by the imposing of a back-pressure in the gas system, thereby increasing the internal pressure of the furnace.

Equipment used heretofore for cleaning and cooling blast furnace gas has frequently included separate gas scrubbers, gas coolers, and electrical precipitators. Equipment used heretofore for imposing back-pressure on the furnace has consisted of a pressure-reducing valve.

One form of equipment to clean gas and impose back-pressure is disclosed in copending application Serial No. 766,072, filed October 8, 1958, by Owen R. Rice and assigned to the assignee of this invention. The apparatus comprises adjustabe orifices arranged in series and water spraying mean so that the particles in the gas at wetted by passing through the orifices. Back-pressure is automatically controlled by position of several orifices. Cooling is accomplished by means of a separate apparatus for spraying water into the gas and for removing the water from the gas.

The cleaning and cooling apparatus used heretofore for cleaning and cooling blast furnace gas were complicated and expensive to install and maintain, and were uneconomical of ground area. The adjustable orifice apparatus disclosed in Serial No. 766,072 includes an arrangement of sliding stems and packing glands wherein the stems are exposed to dirt-laden water, which might require periodic replacement of packing to avoid gas leakage.

An object of this invention, therefore, is to overcome the above mentioned disadvantages.

Another object of this invention is to provide an improved gas cleaner and cooler.

Still another object of this invention is to provide a novel combined gas cleaner, gas cooler, and back-pressure apparatus.

In accordance with one embodiment of this invention, a combined gas cleaner and cooler is provided for the treatment of hot blast furnace discharge gas having entrained material therein and comprises means for wetting the material in the gas, means for removing the wetted material from the gas, and means in operable association therewith for cooling the gas.

The above and further objects and novel features of the invention will appear more fully from the following detailed description when the same is read in connection with the accompanying drawing. It is to be expressly understood, however, that the drawing is not intended as a definition of the invention but is for the purpose of illustration only.

The single FIGURE is an elevational view of an embodiment of this invention, parts appearing in section.

The embodiment of the invention as illustrated in the drawing has particular advantage for cleaning and cooling hot blast furnace gas having entrained material therein. As illustrated, the gas is produced by conventional blast furnace 11 in the reduction of iron ore. In general practice, loading of blast furnace 11 with raw materials such as ore, flux, and coke takes place through bell chamber 13. Generally, the chamber 13 has two coaxially spaced bells 15 and 17 located in a hopper 19 and suitable actuating means (not shown) which selectively raises and lowers the bells. The closing of either bell 15 or 17 against seating surfaces 23 and 25 of hopper 19 prevents the escape of gas from the top of the furnace.

A conventional skip car (not shown) dumps raw materials onto bell 15; thereafter bell 15 opens to dump the materials into hopper 19, which is at atmospheric pressure. To facilitate opening of bell 17, hopper 19 may be pressurized, by means hereinafter described, with cleaned gas extracted from the combined gas cleaner and cooler.

Gas, preferably air, flows under pressure from heaters (not shown) through tuyeres 31 into blast furnace 11. Reactions in the furnace produce blast furnace gas which flows through a system of uptakes and downcomer 33 into a conventional dust catcher 35 which removes large particles of solids from the gas without causing appreciable pressure drop.

In accordance with this invention, conduit 36 conducts a stream of hot gas laden primarily with fine dust particles from dust catcher 35 to combined cleaner-cooler 37. A first conduit 39 conducts the gas stream past sprays 43 which introduce water droplets into the gas stream. The gas and water droplets pass through an orifice plate 45 having a restricted orifice 46 of fixed dimensions and this causes the gas to be washed with a small pressure drop. Thereafter, the gas and dirt laden water advantageously pass through a three-part "septium" valve 47 where an actuating means 55 controls the angles of the butterfly valves 51 and 53 relative to a horizontal plane so as selectively to increase or decrease the gas flow through septum valve 47. Also, the angles of the septum valve control the pressure of the gas after passing through inlet orifice 46 whereby a portion of that gas can flow through conduit 58 to hopper 19 to equalize the pressure in hopper 19 with the pressure present in furnace 11 so that it is easy to open bell 17.

Advantageously the pressure of the gas after passing through septum valve 47 is low. The gas with the dirt laden water passes downward in conduit 39 to outlet 59 spaced from the bottom of conduit 61 and operable therewith to reverse the flow of the gas. The gas reverses its flow and the dirt laden water passses out conduit 63. The dirt separates from the water for recovery by conventional means (not shown). Meanwhile, the reverse gas stream free of dirt and water passes upward in conduit 61 into contact with water introduced by sprays 73 into conduit 61 near the top so as to flow counter to the direction of the gas flow. The water contacts the gas for cooling and the cleaned and cooled gas passes out conduit 74 for combustion in conventional heaters (not shown).

Additional cooling of the gas may be provided by flowing the water from sprays 73 against a heat exchange device 75 which has a plurality of passages 77 for the flow of gas and a large surface area for contacting the gas. Advantageously the heat exchanger comprises a porous tile bank 79 through which the water is free to fall downwardly and the gas is free to pass upwardly with a small pressure drop.

Below the tile bank, a water separator 81 operates to prevent flow of cooling liquid into the bottom part of conduit 61. Separator 81 advantageously comprises an upper substantially frusto conical shaped baffle 83 attached to the outside of conduit 39 such as by welding and a lower coaxially spaced substantially frustro conical shaped baffle plate 85 attached to the inside of conduit 61 in like manner so as to overlap the edge of baffle plate 83 thereby to collect water falling from the upper baffle 83. Thereupon the water collected by baffle 85, which is clean, flows out conduit 87 and can be discharged to a sewer.

In operation, gas which has substantial amounts of dust particles entrained therein, flows through conduit 36 to cleaner-cooler 37. Sprays 43 introduce water droplets into the gas stream and orifice 46 causes the gas to be washed. Orifice 46 cleans the gas passing therethrough to a great degree with little pressure drop.

A minor portion of the gas after passing through inlet orifice 46 may be conducted to hopper 19 by means of conduit 58 to equalize pressure in hopper 19 with that in the furnace 11. To this end two-way valve 90 opens to pressurize hopper 19 so that raw materials on bell 17 can be dumped into the furnace. Prior to opening of bell 15 to load hopper 19, two-way valve 90 closes and two-way valve 91 opens to vent the pressure in hopper 19 to the atmosphere. Upon closure of bell 15 the hopper 19 is pressurized and the above sequence is repeated.

The major portion of the gas passing through orifice 46 passes through septum valve 47, which receives the water from sprays 43 and acts both as a gas cleaning unit and as a back-pressure device. The back-pressure is controlled by means 55 which positions the butterfly valves 51 and 53. The low pressure downstream from the septum valve is that required to deliver gas to points of use. Sprays 73 introduce water into conduit 61 counter to the direction of the reversed gas flow for cooling the gas, part of which cooling may be obtained by means of the extended wetting surface of tile banks 79 through which the water is free to fall downwardly and the gas is free to pass upwardly and through outlet 74 with a small pressure drop.

Water separator 81 may also be a shut off valve to prevent back-flow of gas through conduit 74, which may be connected with similar outlets from other cleaner-coolers like cleaner-cooler 37. To this end when furnace 11 stops its operation conduits 61 and 36 are flooded to a level determined by the pressure of the gas in conduit 74.

This invention has the advantage of a combined gas cleaner and cooler which is efficient and economical of ground growth area. Also, this invention has the advantage that clean gas can be used to pressurize the bell chamber at the top of the blast furnace. Furthermore, this invention has the advantage that a septum valve can be used to contribute to gas cleaning, while being used as a back-pressure device, without inclusion of any sliding sealed member exposed to dirt-laden water.

What is claimed is:

1. Apparatus for cleaning and cooling a stream of blast furnace gas while hot from a blast furnace, comprising: an elongate open-ended inner conduit having an upper upstream inlet and a lower downstream outlet, whereby said gas flows downwardly as a stream from said inlet to said outlet, means adjacent said inlet for introducing wash water into said gas stream, an orifice plate mounted in said inner conduit downstream from said liquid introducing means, back pressure valve means disposed in said conduit downstream from said orifice plate for exerting a back pressure of gas in said inner conduit in a direction toward said orifice plate from said valve means, an outer enclosure conduit encircling and enclosing said inner conduit from adjacent said back pressure valve means to the downstream outlet of said inner conduit, said outer enclosure conduit being of greater diameter than said inner conduit to define an annular gas off-flow space around said inner conduit, water off-flow means at the bottom of said outer enclosure conduit for drawing off spent wash water, a gas outlet from said outer enclosure conduit in the region of the upper part thereof close to said back pressure valve means in the inner conduit, spray means disposed in said annular space of the outer enclosure conduit near the gas outlet therefrom, whereby said spray flows countercurrent to said gas stream complementary baffles in said annular space below said spray means arranged to provide a separate cooling water separator for collecting the water sprayed into the annular space above the lower end of said inner conduit, and separate water discharge means adjacent said complementary baffles for discharging particle laden cooling water from said separator separately from the dirtier water discharged by the aforeside water off-flow means for the lower end of the inner conduit.

2. Apparatus for cleaning and cooling a stream of gas from a blast furnace as claimed in claim 1, and which includes a tile bank disposed in said annular space between the spray means therein and the complementary baffles therein.

3. Apparatus as claimed in claim 1, and which includes a blast furnace system including a blast furnace having an end bell chamber and means communicably connecting said end bell chamber with said inner conduit between said back pressure valve means and said orifice plate for maintaining the pressure in said bell chamber approximately the same as that in the furnace adjacent to the bell chamber by means of clean gas from said furnace.

References Cited in the file of this patent

UNITED STATES PATENTS

| 889,694 | Lambert | June 2, 1908 |
| 2,631,019 | Yates | Mar. 10, 1953 |
| 2,702,699 | Kinney | Feb. 22, 1955 |
| 2,797,904 | Voorheis | July 2, 1957 |
| 2,964,304 | Rice | Dec. 13, 1960 |

FOREIGN PATENTS

| 652,960 | Great Britain | May 2, 1951 |

UNITED STATES PATENT OFFICE

CERTIFICATE OF CORRECTION

Patent No. 3,041,059 June 26, 1962

Russell A. Powell

It is hereby certified that error appears in the above numbered patent requiring correction and that the said Letters Patent should read as corrected below.

Column 1, line 13, for "776,072" read -- 766,072 --; line 40, for "adjustabe" read -- adjustable --; line 41, for "gas at wetted" read -- gas are wetted --.

Signed and sealed this 18th day of December 1962.

(SEAL)
Attest:

ERNEST W. SWIDER
Attesting Officer

DAVID L. LADD
Commissioner of Patents